(12) United States Patent
Tsou

(10) Patent No.: US 8,869,834 B2
(45) Date of Patent: Oct. 28, 2014

(54) PNEUMATIC CONTROL DEVICE OPERATED BY ONE HAND

(71) Applicant: Eric Tsou, Taipei (TW)

(72) Inventor: Eric Tsou, Taipei (TW)

( * ) Notice: Subject to any disclaimer, the term of this patent is extended or adjusted under 35 U.S.C. 154(b) by 237 days.

(21) Appl. No.: 13/684,355

(22) Filed: Nov. 23, 2012

(65) Prior Publication Data
US 2013/0134340 A1 May 30, 2013

(30) Foreign Application Priority Data

Nov. 25, 2011 (TW) .............................. 100143395 A

(51) Int. Cl.
*F16K 11/16* (2006.01)
*F16K 31/44* (2006.01)
*F16K 31/60* (2006.01)
*F15B 13/042* (2006.01)

(52) U.S. Cl.
CPC ............... *F16K 31/60* (2013.01); *F16K 31/607* (2013.01); *F16K 11/168* (2013.01); *F15B 13/0422* (2013.01)
USPC ....................... 137/636.1; 137/627.5; 251/263

(58) Field of Classification Search
USPC ........... 137/636.1, 636.2, 627.5, 613, 614.19, 137/636, 636.4; 251/102, 263, 105
See application file for complete search history.

(56) References Cited

U.S. PATENT DOCUMENTS

| 2,074,240 A | * | 3/1937 | Saunders | ....................... 251/254 |
| 2,345,663 A | * | 4/1944 | Franck | ........................... 417/496 |
| 2,506,063 A | * | 5/1950 | Carbon | ......................... 251/263 |
| 2,508,263 A | * | 5/1950 | Jirsa | ............................ 74/471 R |
| 3,107,695 A | * | 10/1963 | Broadwell | ................ 137/636.1 |
| 6,789,574 B2 | * | 9/2004 | Tsou | ........................... 137/627.5 |
| 7,861,742 B2 | * | 1/2011 | Kim | ........................... 137/625.4 |

FOREIGN PATENT DOCUMENTS

TW 87200342 10/1998
TW 91204509 6/2003

* cited by examiner

*Primary Examiner* — Kevin Lee
*Assistant Examiner* — Daphne M Barry
(74) *Attorney, Agent, or Firm* — Rabin & Berdo, P.C.

(57) ABSTRACT

A pneumatic control device includes a direction control rod, which is connected to a power switch device for activating and shutting off the power switch device. When the direction control rod is in the positive position, the first direction control valve is activated to drive a pneumatic power device. The pneumatic power device drives a hydraulic power tool to move in positive direction. The first direction control valve is shut-off and the second direction control valve is activated when the direction control rod is moved to the opposite position. The activated second direction control valve drives the pneumatic power device; the pneumatic power device drives the hydraulic power tool to move in opposite direction. When the direction control rod is moved to the opposite position, the activated power switch device is relieved and automatically shut off to stop supplying power to the hydraulic power tool.

4 Claims, 6 Drawing Sheets

PNEUMATIC CONTROL DEVICE OPERATED BY ONE HAND

CROSS-REFERENCE TO RELATED APPLICATION

This application claims the priority of Taiwanese patent application No. 100143395, filed on Nov. 25, 2011, which is incorporated herewith by reference.

BACKGROUND OF THE INVENTION

1. Field of the Invention

The present invention relates to a pneumatic control device for a hydraulic power tool, and the pneumatic control device is operated by one hand.

2. The Prior Arts

Heavy equipments, such as dump trucks and cranes, are often used during constructions or civil engineering. In order to provide powerful output, hydraulic power is chosen for the heavy equipment. The hydraulic power system needs a motor to pressurize the hydraulic fluid to drive the hydraulic power tool. The motor can be an electric motor or an internal combustion engine. In the civil engineer, it is usually the combustion engine. Before the hydraulic power tool is operated, the combustion engine has to be activated or the power generated by the combustion engine is supplied to a pump device which provides the pressurized hydraulic fluid to the tool. After the jobs of the tools are finished, the connection between the combustion engine and the pump device is cut off by operating a clutch-like mechanism to stop the working of the pump device.

A conventional engineering tool is equipped with an operation control device, and thus the users can use the operation control device to operate the hydraulic power tool. Some of the operation control devices are operated by electricity and some of the operation control devices are operated by pressurized air. For engineering vehicles, the pneumatic device is basic equipment so that using the pneumatic device to control the hydraulic power tools is a proper choice. The conventional pneumatic control device has a power control rod and a direction control rod. The power control rod controls the pressurized air to be sent to the pneumatic power tools and controls the connection between the combustion engine and the pump device. The direction control rod controls the direction that the pressurized air provided to the pneumatic power devices so that the pneumatic power device controls the direction that the hydraulic power tools work. Generally, the power control rod is used to control the operation of the pressurized air which is provided to the connection between the combustion engine and the pump device. The direction control rod is then used to control the direction that the hydraulic power tool moves. There is a stop position for the hydraulic power tools so that when the tools are not in use, the tools can be positioned at that position. For example, the dump truck lowers its bed to the lowest position when not in use. After the work of the hydraulic power tool is finished, one control rod is operated to stop supplying the pressurized air and the tool would be back to its stop position by gravity. However, there are two control rods to operate two operations, respectively. The users may frequently forget to operate the other control rod to disengage the combustion engine from the pump device.

In order to overcome the shortcomings mentioned above, the applicant brings up a granted patent (Application No. TW87200342) (the first patent hereinafter). However, the structure of the first patent is still complicated. Thus, in order to reduce the manufacturing cost, the applicant brings up a second granted invention (Application No. TW91204509) (the second patent hereinafter). The second patent allows the user to operate the two rods to simultaneously stop the hydraulic power tools and the pressurized air. Furthermore, the direction control rod is simplified so as to have the benefit of low manufacturing cost. Nevertheless, the first and/or the second patents have two control rods (the power control rod and the direction control rod), and a connection device is needed to be connected between the two rods so that the structure is still complicated. If the users want to operate by one hand, the hand has to be moved between the two rods and this is not convenient for the users.

SUMMARY OF THE INVENTION

The primary objective of the present invention is to provide a pneumatic control device which includes fewer parts and the users simply operates one control rod to control the power to be activated or shut off, and to control the direction of operation.

In order to achieve the objective, a pneumatic control device according to the present invention includes a direction control rod operated between a positive position, a neutral position and an opposite position, and the direction control rod is connected to a power switch device so that the users use one hand to operate the direction control rod and to activate or shut off the power switch device and perform positioning. When the direction control rod is in the positive position, pressurized air passes through an opened first direction control valve and drives a pneumatic power device which generally is a cylinder. The pneumatic power device then drives a hydraulic power tool to move in the positive direction. The first direction control valve is shut-off and the second direction control valve is activated when the direction control rod is moved from the positive position or the neutral position to the opposite position. The first direction control valves is shut off and the second direction control valve is activated and pressurized air passes through the second direction control valve to drives the pneumatic power device. Then, the pneumatic power device drives the hydraulic power tool to move in the opposite direction. When the direction control rod is shifted to the opposite direction, the power switch device that is positioned at the activated status is relieved and automatically shut off to stop supplying power to the hydraulic power tool.

The present invention provides a pneumatic control device comprising a direction control rod which is operated between a positive position, a neutral position and an opposite position. The direction control rod is connected to a first direction valve and a second direction valve. Each of the first direction valve and the second direction valve is operated between an activated status and a shut-off status. The first direction control valve is in the activated status and the second direction control valve is in the shut-off status when the direction control rod is in the positive position. The first direction control valve is in the shut-off status and the second direction control valve is in the activated status when the direction control rod is in the opposite position. Both of the first and second direction control valves are in the shut-off status when the direction control rod is in the neutral position. Pressurized air passes through the first or second direction control valves when the first or second direction control valve is activated, and the pressurized air activates the pneumatic power device which drives the hydraulic power tool. The direction control rod is connected to a power switch device that controls the hydraulic power tool. The power switch device comprises the following components. The power switch device includes a block which has an inlet and the first and second direction control valves are connected to the inlet via a path in the block. A base is connected to the block and a swing member is pivotably connected to the base. Two activation members are respectively connected to two sides of the swing member. A seal member is cooperated with a spring and located in the block so as to control the inlet to open or to close. A valve rod is located within the block and a first end of the valve rod contacts with the seal member. A central rod is connected to the direction control rod and passes through the swing member. A first end of the central rod contacts with a second end of the valve rod. A positioning rod is connected to the direction control rod and a first end of the positioning rod contacts with a second end of the central rod. A cam is pivotably connected to the direction control rod and has a lever, a positioning recess and a protruding portion. The cam contacts with a second end of the positioning rod. A return rod is movably connected to the direction control rod and movable relative to the direction control rod so as to control the return rod to touch the lever of the cam or not to touch the lever of the cam. A button is connected to the direction control rod and contacts with the lever of the cam so as to control rotation of the cam. A link has a first end contacting with the base and the central rod passes through a second end of the link. The second end of the link contacts with the direction control rod.

When the second end of the positioning rod is restricted in the positioning recess of the cam, the seal member closes the inlet. When the button is operated and activates the lever of the cam, the positioning rod is driven by the cam to move away the positioning recess of the cam. The positioning rod drives the central rod, the valve rod and the seal member to open the inlet and the positioning rod is positioned at the protruding portion of the cam. When the direction control rod moves toward the positive position, one of the activation members drives the first direction control valve to be activated and the second direction control valve to be shut off. When the direction control rod moves toward the opposite position, the other one of the activation members drives the second direction control valve to be activated and the first direction control valve to be shut off. At the same time, the link drives the direction control rod to move the return rod to push the cam. The second end of the positioning rod moves away from the protruding portion of the cam and is restricted in the positioning recess of the cam. The central rod, the valve rod and the seal member return to the original position and close the inlet.

Preferably, the direction control rod has a case and a base part. The case includes a head and an inner space. The base part has a central hole and the outer diameter of the base part is sized to be movable in the inner periphery of the inner space. The return rod is slidably cooperated with the case and has one end connected to the base part. The second end of the link contacts with the base part.

Preferably, the activation member is a threaded rod.

Preferably, the link has two extension rods extending toward the first end thereof and a hole is defined through the second end of the link. The extending rods contact with the base and the central rod extends through the hole in the second end of the link.

Therefore, the users simply use one hand to operate the pneumatic control device according to the present invention and to control the power tool to move toward the positive direction or the opposite direction. When the direction control rod is moved to the opposite direction, the pressurized air is automatically cut off to avoid from consumption and protect the operation environment.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
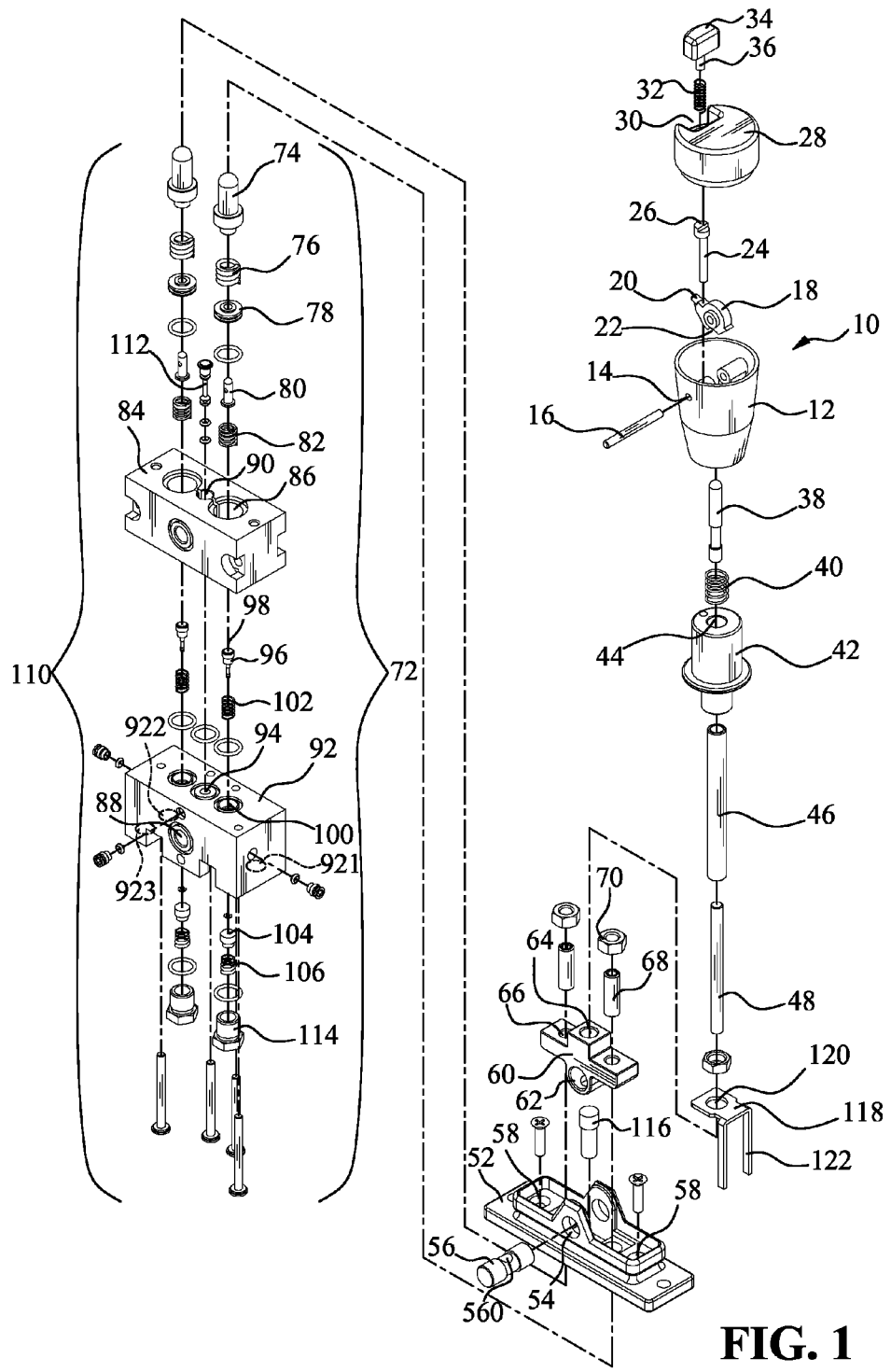
FIG. 1 is an exploded view to show a pneumatic control device according to the present invention.
Figure 2:
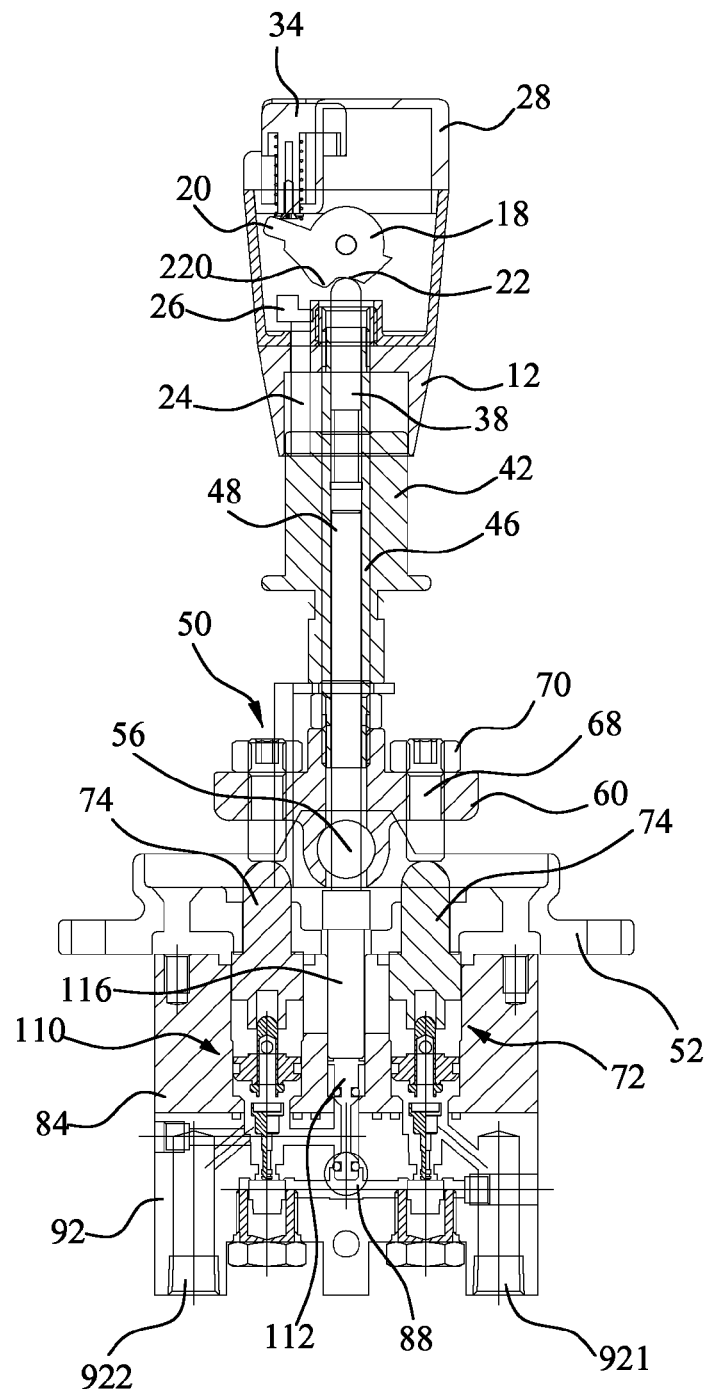
FIG. 2 is a cross sectional view to show the pneumatic control device according to the present invention, wherein a power switch device is not yet activated.

Referring to FIGS. 1 to 2, a pneumatic control device according to the present invention comprises a direction control rod 10 which is operated between a positive position, a neutral position and an opposite position. The neutral position is located between the positive position and opposite position so that the direction control rod 10 could be moved along a first direction, which is from the neutral position to the positive position. Thus, the pressurized air is controlled to drive the related pneumatic power devices. The pneumatic power devices then drive the hydraulic tools to move along the positive direction to work. Alternatively, the direction control rod 10 could be moved along a second direction, which is from the neutral position to the opposite position. Thus, the pressurized air is controlled to drive the pneumatic power devices. The pneumatic power devices then drive the hydraulic tools to move along the opposite direction.

The positive direction and the opposite direction described in the specification mean the two directions that the hydraulic power tools move. For example, the positive position is used to pump the hydraulic fluid to the hydraulic cylinders of the hydraulic ram for the dumper bed of the dump truck so that the dumper bed could be lifted. At the opposite position, the hydraulic fluid is pumped out of the hydraulic cylinders to lower the dumper bed. At the neutral position, the hydraulic power tool is temporarily stopped at the current position and does not move along any direction.

The description mentioned above uses the directions that the hydraulic fluid is pumped into or out of the hydraulic cylinders to define the positive direction and the opposite direction. It is understood that the positive direction and the opposite direction can also be defined by that the communication of the hydraulic fluid entering into two sides of the piston of the hydraulic cylinder to control the inlet and outlet of the hydraulic fluid of the hydraulic power tool. For example, when the first direction control valve 72 is activated, the pressurized air is sent to the pneumatic power device and then the pneumatic power device drives the hydraulic power tool such as a hydraulic cylinder to work (for example to move along the positive direction). On the other hand, when the second direction control valve 110 is activated, the pressurized air is sent to the pneumatic power device and then the pneumatic power device drives the hydraulic power tool to move along the opposite direction. In order to avoid problems of controlling the hydraulic power tool to be set at the positive direction and the opposite direction, when the direction control rod 10 is set on the neutral position, the first and second direction control valves 72, 110 are in shut-off status. When the direction control rod 10 is in the positive position, the first direction control valve 72 is in the activated status and the second direction control valve 110 is in the shut-off status. When the direction control rod 10 is in the opposite position, the first direction control valve 72 is in the shut-off status and the second direction control valve 110 is in the activated status. In other words, the first and second direction control valves 72, 110 would not be activated simultaneously.

The direction control rod 10 is connected to a power switch device 50 which is used to control the supply of the pressurized air. When the first direction control valve 72 is in the activated status (the direction control rod 10 is at the positive position), the power switch device 50 has to be activated such that the pressurized air is supplied to the pump which sends the pressurized hydraulic fluid to the hydraulic power tool to work toward the positive direction. When the first direction control valve 72 is shut off and the second direction control valve 110 is activated (the direction control rod 10 is at the opposite position), the power switch device 50 can be activated according to the design of the hydraulic power tool. If the hydraulic power tool needs reverse pressure to move in the opposite direction, the power switch device 50 is activated. In some situations, the opposite direction movement of the hydraulic power tool can be done by gravity without extra reverse pressure. In these situations, the power switch device 50 can be shut off. In yet other situations, the reverse pressure is needed (i.e. the hydraulic fluid is applied on the reverse direction) to drive the hydraulic power tool to move in the opposite direction.

According to the present invention, the power switch device 50 and the direction control rod 10 are co-operated, when the direction control rod 10 is moved from the neutral position to the opposite position and no reverse pressure is required, the power switch device 50 can quickly jump from the activated position to the shut-off position to stop the supply of the pressurized air to the pump. Thus, the hydraulic fluid is stopped supplying to the hydraulic power tool.

According to a preferred embodiment of the present invention, the power switch device 50 comprises a main body having a first block 84 and a second block 92. The first block 84 has a first air hole 90 and the second block 92 has a second air hole 94 which is located corresponding to the first air hole 90. The first block 84 has two first holes 86 disposed at two sides of the first air hole 90, respectively. The second block 92 has two second holes 100 disposed at two sides of the second air hole 94 and corresponding to the first holes 86, respectively. When the first and second blocks 84, 92 are connected with each other, the first holes 86 respectively communicate with the corresponding second holes 100. The communicated first and second holes 86, 100 respectively accommodate a first direction control valve 72 and a second direction control valve 110. The communicated first and second air holes 90, 94 receive a power control valve. The second block 92 has an inlet 88 which communicates with the first direction control valve 72 and the second direction control valve 110 via a path in the blocks. The inlet 88 is connected to the source of the pressurized air via tubes. The positive air hole 921 and the opposite air hole 922 located at the lower end of the second block 92 respectively connected to different positions of the pneumatic power device (not shown). The outlet 923 is connected to a clutch device (not shown) of the pump. The first direction control valve 72 controls the pressurized air to be flown out from the positive air hole 921, and the second direction control valve 110 controls the pressurized air to be flown out from the opposite air hole 922.

Because the first direction control valve 72 at the positive position has the same structure as the second direction control valve 110 at the opposite position, the description regarding to the first direction control valve 72 is the same as that to the second direction control valve 110. As shown in FIGS. 1 and 2, the first direction control valve 72 includes a first rod 74, a first spring 76 connected to the lower end of the first rod 74, a piston 78 connected to the lower end of the first spring 76, a second rod 80 passing through the piston 78 and inserted in the recess of the lower end of the first rod 74, a second spring 82 located beneath the piston 78, and a third rod 96 connected to the lower end of the second rod 80. The top end and the lower end of the third rod 96 are connected to a pad 98 and a third spring 102, respectively. The parts of the first direction control valve 72 are respectively installed to the first hole 86 of the first block 84 and the second hole 100 of the second block 92. A Nut 114 is then cooperated with a fourth spring 106 and a plug 104 to seal the lower end of the second hole 100. The plug 104 is pressed to contact with the lower end of the third rod 96. When there is no external force applied to the first and second direction control valves 72, 110, the third spring 106 applies a force to the plug 104 which is then moved into the path in the second block 92 to cut the communication between the inlet 88 and the first direction control valve 72. In the same way, the second direction control valve 110 does not communicate with the inlet 88.

A base 52 is located above the first block 84 and the top ends of the first rods 74 of the first and second direction control valves 72, 110 extend through two holes 58 of the base 52. A second pivot 56 extends through pivotal holes 54 on two sides of the base 52 and a second pivotal hole 62 of a swing member 60 so as to pivotably connect the swing member 60 to the base 52. The swing member 60 is pivoted relative to the base 52. The swing member 60 includes a central threaded hole 64. The two sides of the swing member 60 respectively have a threaded hole 66 and two threaded rods 68 are connected to the threaded holes 66, and two nuts 70 are used to secure the threaded rods 68 to the swing member 60. The lower ends of the two threaded rods 68 extend beyond the lower end of the swing member 60 and are located corresponding to the two first rods 74 of the first and second direction control valves 72, 110. The threaded rods 68 are used to control the first or second direction control valve 72/110 to be activated.

In addition to the blocks, the base 52 and the swing member 60, the power switch device 50 further comprises a spring cooperated with a seal member 112, a valve rod 116, a central rod 48, a positioning rod 38, a cam 18, a return rod 24, a button 34 and a link 118 connected to the first and second air holes 90, 94 of the first and second blocks 84, 92. The seal member 112 and the valve rod 116 form the power control valve. The valve rod 116 is received in the first air hole 90 of the first block 84 so that a first end (lower end) of the valve rod 116 contacts with a second end (top end) of the seal member 112. The central rod 48 extends through a central tube 46 and both of the central tube 46 and the central rod 48 extend through the central threaded hole 64 of the swing member 60 and a through hole 560 of the second pivot 56, and the central tube 46 is threadedly connected to the central threaded hole 64 by its outer threads so as to form the shaft device of the direction control rod 10. Accordingly, a first end (lower end) of the central rod 48 contacts with the second end (top end) of the valve rod 116. The link 118 has two extension rods 122 extending toward a first end (lower end) thereof and a second end (top end) of the link 118 is bent to form a board through which a hole 120 is defined. The direction control rod 10 has a case 12 which has a head 28 on the top and a space defined in the lower end thereof, and a base part 42 having a central hole 44. The outer diameter of the base part 42 is sized to be corresponding to the inner diameter of the space of the case 12 and therefore the base part 42 is slidable within the space of the case 12. The button 34 is located in a notch 30 in one side of the head 28. A rod 36 is connected to the lower end of the button 34 and is cooperated with a spring 32 and connected to the head 28. By the spring 32 applied to the button 34, the button 34 is normally in flush with the top surface of the head 28 when no external force is applied to the button 34. When the button 34 is pressed, the spring 32 is compressed and when the button 34 is released, the spring 32 moves the button 34 back to its original position. The central tube 46, with the central rod 48 extending therethrough, extends through the hole 120 of the link 118 and the central hole 44 of the base part 42. A spring 40 and the positioning rod 38 are inserted into the central hole 44 of the base part 42. The base part 42 is then received in the space of the case 12 so that the top end of the link 118 contacts with the lower end of the base part 42. The lower ends of the extension rods 122 contact with the base 52. The cam 18 and the return rod 24 are located in the case 12. The cam 18 is pivotably connected to the inside of the case 12 by extending the first pivot 16 through a first hole 14 of the case 12. The return rod 24 slides through the platform in the case 12, and the lower end of the return rod 24 is fixed to the top of the base part 42. The cam 18 has a positioning recess 22, a protruding portion 220 and a lever 20. The lever 20 is located corresponding to the rod 36 located beneath the button 34 and a protrusion 26 on the top of the return rod 24.

The operation of the present invention is described in the following. Referring to FIG. 2, when the direction control rod 10 is at the neutral position and the button 34 is not pressed, the top end of the positioning rod 38 is restricted in the positioning recess 22. The first and second direction control valves 72, 110 are in shut-off status because no action is made. The pressurized air cannot pass through the first and second direction control valves 72, 110 to be supplied to the pneumatic power device and therefore the pneumatic power device cannot drive the hydraulic power tool.

Figure 3:
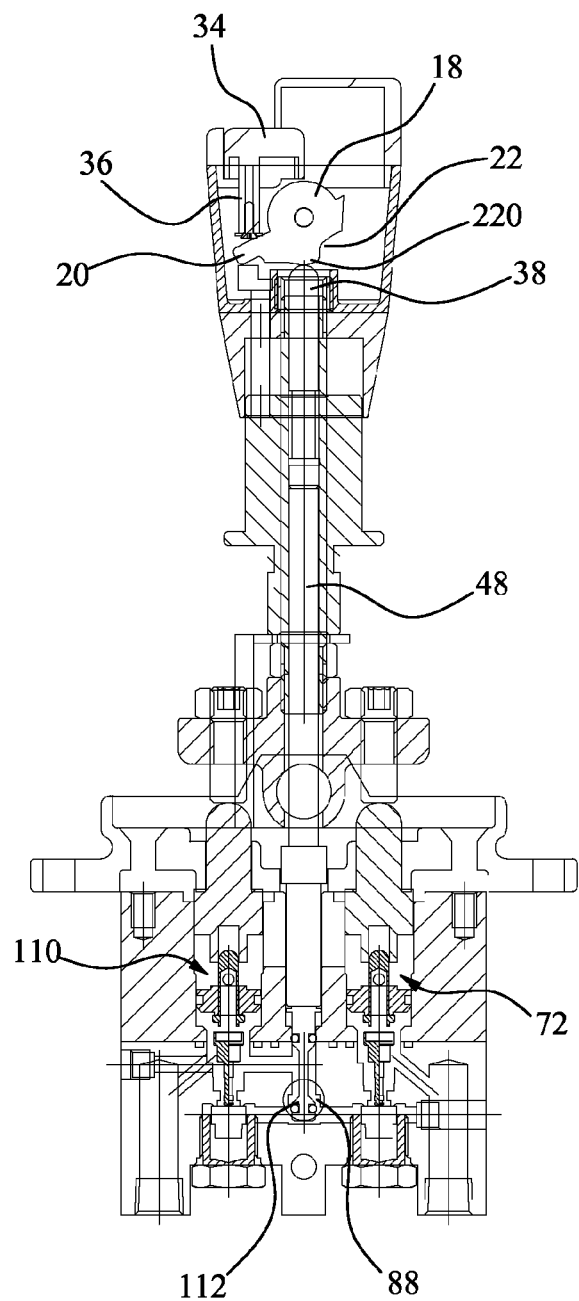
FIG. 3 is a cross sectional view to show the pneumatic control device according to the present invention, wherein the power switch device is activated and positioned.

Referring to FIG. 3, when the user's hand holding the case 12 presses the button 34, the rod 36 applies a force to the lever 20 to rotate the cam 18 so that the top end of the positioning rod 38 is disengaged from the positioning recess 22 and is positioned at the protruding portion 220 beside the positioning recess 22. The positioning rod 38 is driven by the cam 18 and axially moved to push the central rod 48. The central rod 48 moves the valve rod 116, the valve rod 116 pushes the seal member 112, and the seal member 112 release the sealing to the inlet 88. The pressurized air enters into the path of the main body through the inlet 88. Because the first and second direction control valves 72, 110 are in shut-off status, the pneumatic power tool is not activated.

Figure 4:
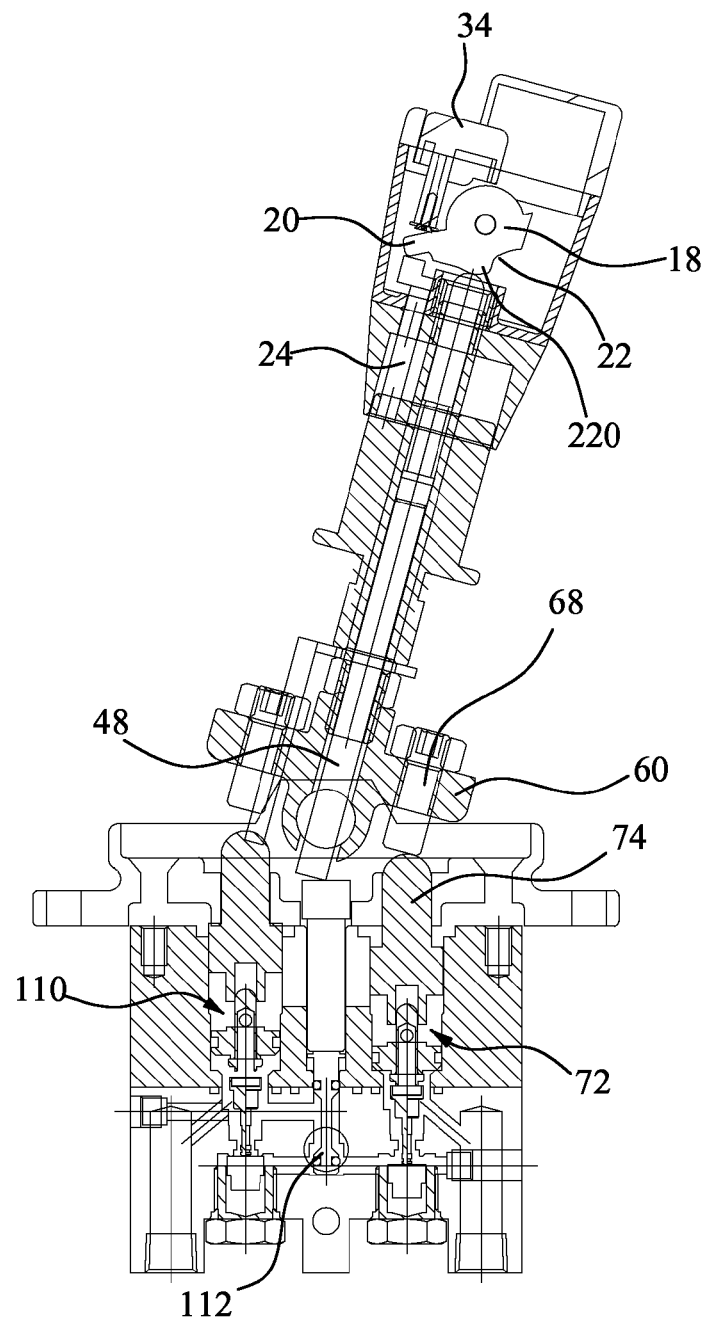
FIG. 4 is a cross sectional view to show that the power switch device is activated and the direction control rod is moved to the positive position.

As shown in FIG. 4, when the user presses the button 34 to open the inlet 88 and moves the direction control rod 10 toward the positive position, the threaded rod 68 served as one of the activation members pushes the first rod 74 of the first direction control valve 72 and the first rod 74 pushes the piston 78 and the third rod 96 to open the first direction control valve 72. During the movement of the direction control rod 10 to the positive position, the valve rod 116 is kept at the position to push the seal member 112 and the inlet 88 is opened. Therefore, the pressurized air entering the inlet 88 is introduced into the pneumatic power tool via the first direction control valve 72, and the pneumatic power tool provides the power to the hydraulic power tool to work toward the positive direction. In the meanwhile, the second direction control valve 110 is still shut off.

Figure 5:
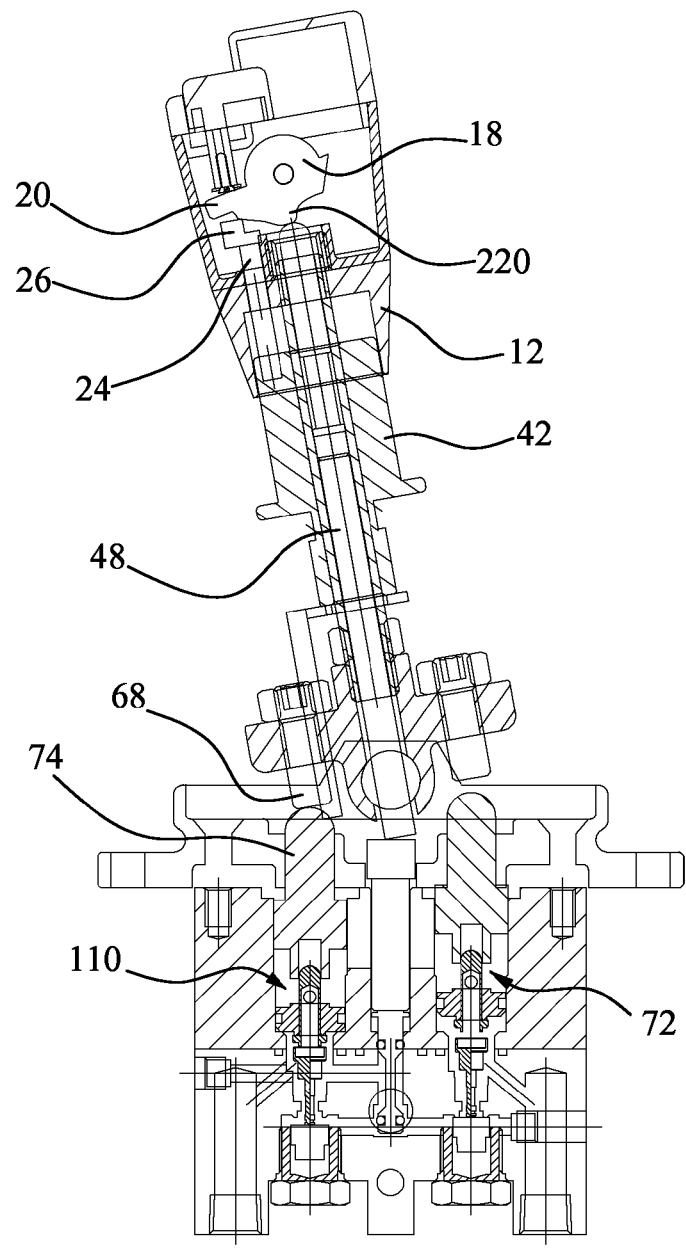
FIG. 5 is a cross sectional view to show that the power switch device is activated and the direction control rod is moved from the neutral position to the opposite position.
Figure 6:
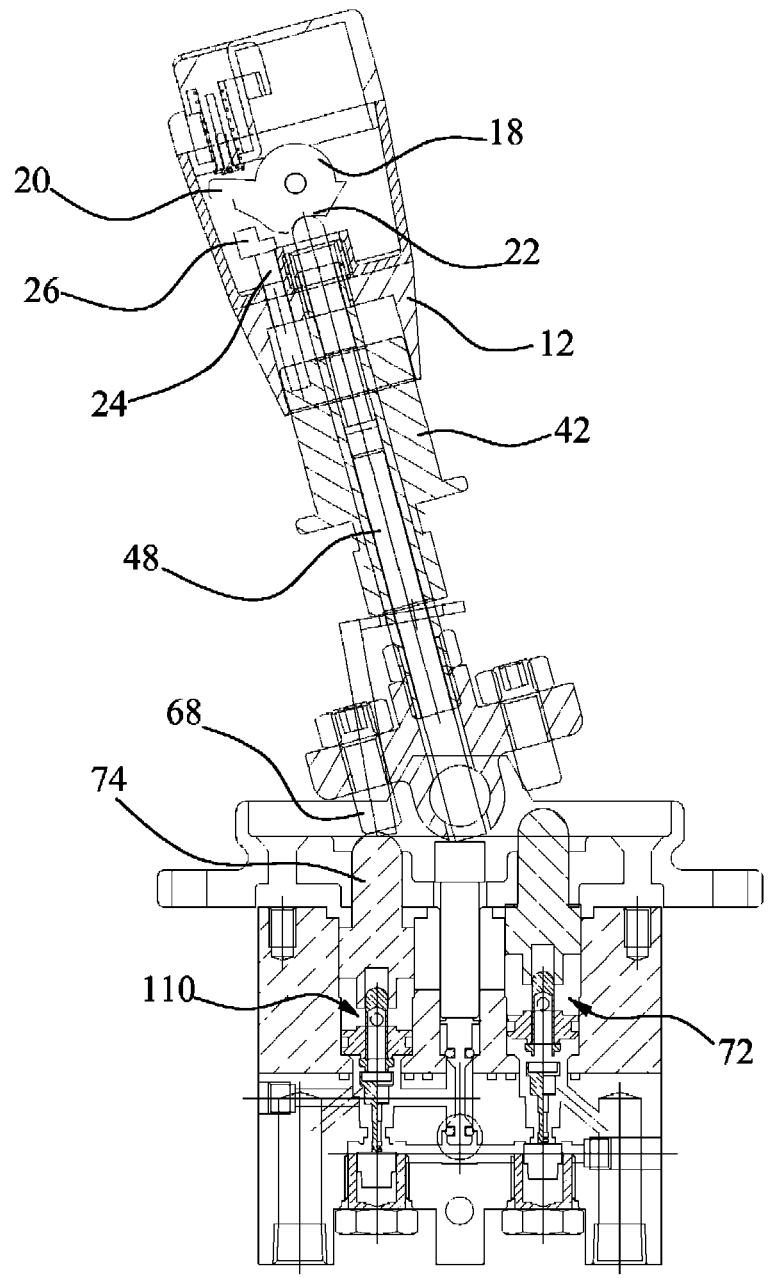
FIG. 6 is a cross sectional view to show that the power switch device is activated and the direction control rod is moved to the opposite position and positioning is released.

As shown in FIGS. 5 and 6, when the direction control rod 10 is moved from the positive position to the opposite position, the first rod 74 of the first direction control valve 72 is released. Thus, the third spring 102 pushes the third rod 96, the second spring 82 pushes the second rod 80, the first spring 76 pushes the first rod 74 back to the original position and the fourth spring 106 pushes the plug 104 to seal the second hole 100 so that the first direction control valve 72 is shut off. The first rod 74 of the second direction control valve 110 is pressed by the other threaded rod 68 so that the second direction control valve 110 is opened. The link 118 is moved relative to the central tube 46 by the movement of the direction control rod 10, and the top end of the link 118 pushes the base part 42 to move relative to the case 12. The base part 42 pushes the return rod 24 so that the protrusion 26 pushes the lever 20 to rotate the cam 18 reversely. The positioning rod 38 is then removed from the protruding portion 220 and the spring 40 pushes the positioning rod 38 to let the top end of the positioning rod 38 to be positioned in the positioning recess 22 as shown in FIG. 6. The seal member 112 seals the inlet 88 again and the pressurized air cannot be supplied to the pump and the hydraulic fluid cannot be supplied to the hydraulic power tool. The opposite travel of the hydraulic power tool can be done by the gravity to the hydraulic power tool itself.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A pneumatic control device, comprising:
a direction control rod being operated between a positive position, a neutral position and an opposite position, the direction control rod connected to a first direction valve and a second direction valve, each of the first direction valve and the second direction valve being operated between an activated status and a shut-off status, when the direction control rod is in the positive position, the first direction control valve being in the activated status and the second direction control valve being in the shut-off status, when the direction control rod is in the opposite position, the first direction control valve being in the shut-off status and the second direction control valve being in the activated status, when the direction control rod is in the neutral position, both of the first and second direction control valves are in the shut-off status, when the first direction control valve or second direction control valve is activated, pressurized air respectively passing through the first direction control valve or second direction control valve;
wherein the direction control rod is connected to a power switch device, the power switch device includes:
a block having an inlet, the inlet connected to the first direction control valve, the second direction control valve and a power control valve via a path in the block;
a base connected to the block;

a swing member pivotably connected to the base, two activation members respectively connected to two sides of the swing member;

a seal member cooperated with a spring and located in the block so as to control the inlet to open or to close;

a valve rod located within the block, a first end of the valve rod contacting with the seal member;

a central rod connected to the direction control rod and passing through the swing member, a first end of the central rod contacting with a second end of the valve rod;

a positioning rod connected to the direction control rod and a first end of the positioning rod contacting with a second end of the central rod;

a cam pivotably connected to the direction control rod and having a lever, a positioning recess and a protruding portion, the cam contacting with the second end of the positioning rod;

a return rod movably connected to the direction control rod and being movable relative to the direction control rod so as to control the return rod to touch the lever of the cam or not to touch the lever of the cam;

a button connected to the direction control rod and contacting with the lever of the cam so as to control rotation of the cam; and a link having a first end contacting with the base and the central rod passing through a second end of the link, the second end of the link contacting with the direction control rod;

wherein when the second end of the positioning rod is restricted in the positioning recess of the cam, the seal member closes the inlet, when the button is operated and activates the lever of the cam, the positioning rod is driven by the cam and drives the central rod, the valve rod and the seal member to open the inlet, and the positioning rod is positioned at the protruding portion of the cam, when the direction control rod moves toward the positive position, one of the activation members drives the first direction control valve to be activated and the second direction control valve to be shut off, when the direction control rod moves toward the opposite position, the other one of the activation members drives the second direction control valve to be activated and the first direction control valve to be shut off, the link drives the direction control rod to move the return rod to push the cam, the second end of the positioning rod moves away from the protruding portion of the cam and is restricted in the positioning recess of the cam, the central rod, the valve rod and the seal member return to close the inlet.

2. The device as claimed in claim 1, wherein the direction control rod includes a case and a base part, the case includes a head and an inner space, the base part has a central hole and an outer diameter of the base part is sized to be movable in an inner periphery of the inner space of the case, the return rod is slidably cooperated with the case and has one end connected to the base part, the second end of the link contacts with the base part.

3. The device as claimed in claim 1, wherein the activation member is a threaded rod.

4. The device as claimed in claim 1, wherein the link includes two extension rods extending toward the first end thereof and a hole is defined through the second end of the link, the extending rods contact with the base and the central rod extends through the hole of the link.

* * * * *